United States Patent
Yen

(10) Patent No.: US 7,515,255 B2
(45) Date of Patent: Apr. 7, 2009

(54) METHOD AND APPARATUS FOR DETECTING CONCENTRICITY OF LENS MODULE

(75) Inventor: Shih-Chieh Yen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 28 days.

(21) Appl. No.: 11/850,814

(22) Filed: Sep. 6, 2007

(65) Prior Publication Data
US 2008/0204728 A1 Aug. 28, 2008

(30) Foreign Application Priority Data
Feb. 27, 2007 (CN) .......................... 2007 1 0200238

(51) Int. Cl.
*G01B 9/00* (2006.01)
(52) U.S. Cl. ...................................... 356/127; 356/124
(58) Field of Classification Search ........................ None
See application file for complete search history.

(56) References Cited

U.S. PATENT DOCUMENTS 4,381,523 A * 4/1983 Eguchi et al. ............... 348/350

* cited by examiner

*Primary Examiner*—Michael P Stafira

(57) ABSTRACT

A detecting apparatus includes a light source configured (i.e., structured and arranged) for irradiating the lens module with light, the light being brought into a focus by the lens module; a detecting device configured for measuring and recording a location of the focus; and a driving device configured for driving a barrel of the lens module to rotate relative to a holder of the lens module. The detecting apparatus is particularly configured such that, when the driving device drives the barrel of the lens module to rotate to two different angular locations, the light source irradiates the lens module with light, the lens module making the light be brought into two respective focuses at (i.e., relative to) the two different angular locations, and the detecting device measures a deviation distance between the two respective focuses. A method of detecting concentricity of a lens module is further provided.

6 Claims, 3 Drawing Sheets

METHOD AND APPARATUS FOR DETECTING CONCENTRICITY OF LENS MODULE

BACKGROUND

1. Technical Field

The present invention relates to a concentricity-detecting apparatus and method for precisely detecting a level/degree of concentricity of a lens module.

2. Description of Related Art

Nowadays, with the development of the optical imaging technology, camera modules are now in widespread use. Camera modules are being combined with various portable electronic devices such as mobile phones, PDAs (personal digital assistants) and portable computers, to make such devices increasingly multi-functional.

A typical camera module generally has a lens module mounted therein. The lens module is coupled with an image sensor such as a charge coupled device (CCD) or a complementary metal oxide semiconductor (CMOS) so as to capture images. Generally, the lens module includes a holder and a barrel pivotably received in the holder. A plurality of lenses and spacers is alternately received in the barrel. Preferably, an infrared-cut filter that blocks light in the infrared spectrum is also fitted in the lens module to prevent interference. Before the qualified lens module is entered in a market, the imaging quality of the lens module after assembly must be ensured. Accordingly, the degree/level of the concentricity of the holder and the barrel therein the hold must be detected, in order to ensure that the camera qualifies to be sold on the market.

Conventionally, manual detection for concentricity of the lens module has low efficiency and speed, to a certain degree. Further, the concentricity of the lens module may not be precisely measured, due to operators error and/or skill limitations. Therefore, it is nearly impossible to ensure that every detected lens module is qualified when relying on manual inspection.

An improved apparatus and method for precisely detecting concentricity of the lens module is thus desired to thereby overcome the above-mentioned disadvantages. What is needed, therefore, is a detecting apparatus and method for precisely detecting/measuring the level/degree of concentricity of a lens module.

SUMMARY

In a present embodiment, the detecting apparatus includes a light source configured for irradiating the lens module with light, the light being brought into a focus by the lens module; a detecting device being configured for measuring and recording a location of the focus; and a driving device configured for driving a barrel of the lens module to rotate relative to a holder of the lens module. The detecting apparatus is particularly configured such that, when the driving device drives the barrel of the lens module to rotate to two different angular locations, the light source irradiates the lens module with light, the lens module making the lens module bring the light into two respective focuses at (i.e., relative to) the two different angular locations, and the detecting device measures a deviation distance between the two respective focuses.

A method of a detecting concentricity of a lens module, comprising the steps of:

(a) providing a driving device for driving a barrel of the lens module to rotate relative to a holder of the lens module;

(b) providing a light source for irradiating the lens module, the light source to be brought into focus relative to a given lens module position, the lens module being driven to rotate by the driving device to yield different focuses;

(c) providing a detecting device for measuring a deviation distance between the different focuses, thereby judging the concentricity of the lens module.

BRIEF DESCRIPTION OF THE DRAWINGS

Many aspects of the present apparatus and method for detecting a concentricity of a lens module can be better understood with reference to the following drawings. The components in the drawings are not necessarily drawn to scale, the emphasis instead being placed upon clearly illustrating the principles of the present apparatus and method. Moreover, in the drawings, like reference numerals designate corresponding parts throughout the several views.

DETAILED DESCRIPTION OF THE EMBODIMENTS

Embodiments will now be described in detail below and with reference to the drawings.

Figure 1:
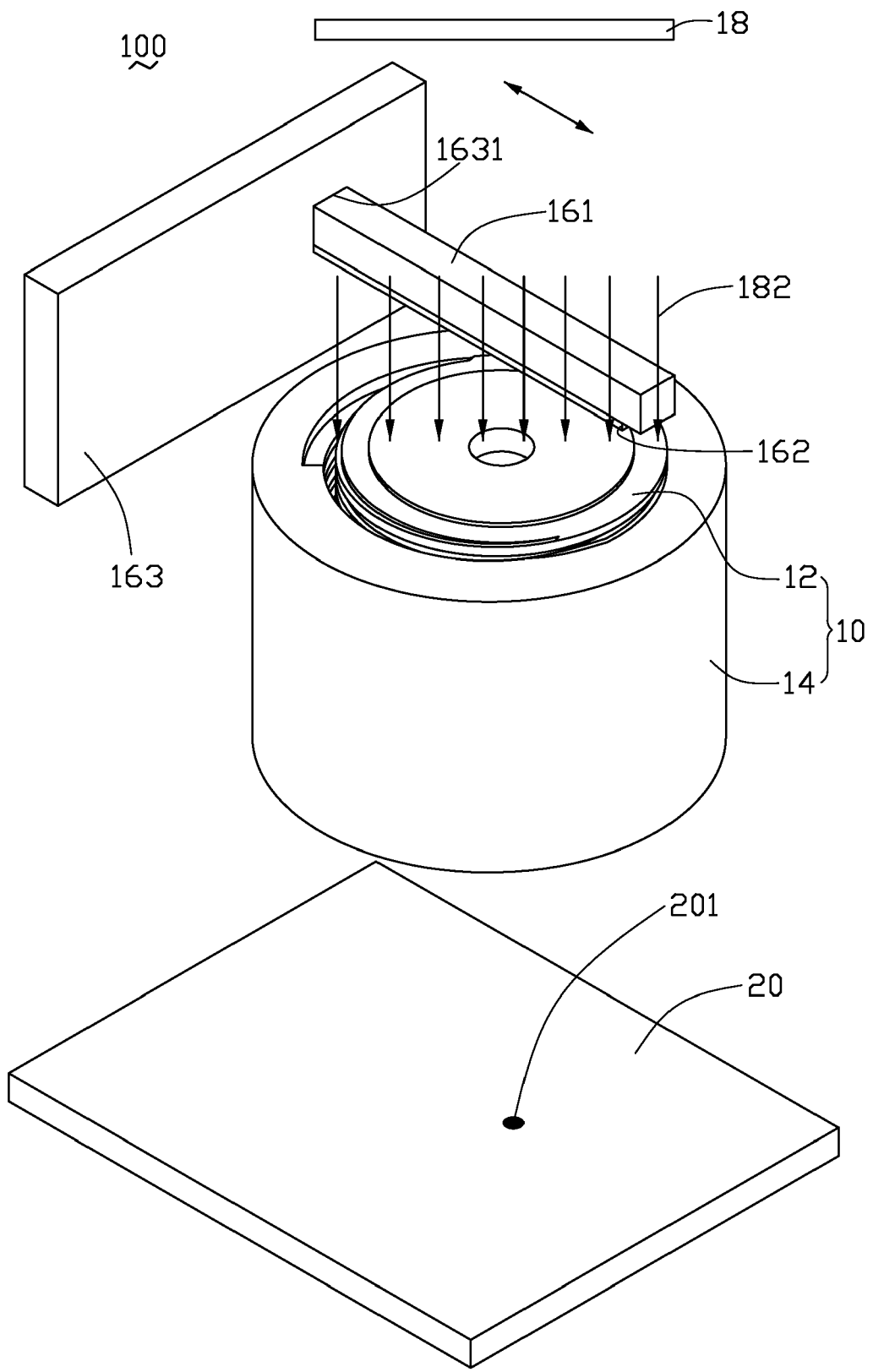
FIG. 1 is a schematic view of a detecting apparatus for detecting concentricity of a lens module according to a first present embodiment.

Referring to FIG. 1, a detecting apparatus 100 for detecting concentricity of a lens module 10, according to a first present embodiment, includes a driving device 16, a light source 18, and a detecting device 20 for detecting a potential deviation of an optical (i.e. focal) axis of the lens module 10. The lens module 10 includes a barrel 12 and a holder 14 for receiving the barrel 12 therein. The lens module 10 inherently has at least one lens (not specifically shown) mounted therein.

The driving device 16 includes a driving rod 161, a friction block 162 mounted on the driving rod 161, a retaining member 163 configured for limiting movement of the driving rod 161, and a motor (not shown). The driving rod 161, located/positioned over a top end of the lens module 10, can be selectably moved back and/or forth by the motor (e.g., a servo-motor). The friction block 162 is mounted on a bottom portion of the driving rod 161 and is configured for contacting the barrel 12, thereby avoiding damage of the barrel 12. Advantageously, the friction block 162 is made of a rubber material with a high friction coefficient, in order to enhance friction between the driving rod 161 and the barrel 12. Therefore, when the driving rod 161 drives the barrel 12 to rotate relative to the holder 14, the driving rod 161 is prevented from sliding relative to the barrel 12, thereby avoiding damage to a surface of the barrel 12. According to the first embodiment, the following relation is satisfied between the driving rod 161 and the barrel 12: $L=\theta r$, wherein L is an effective length of the driving rod 161, and $\theta$ is a rotary angle that the barrel 12 is driven to rotate relative to the holder 14, and r is a radius of the barrel 12. In the first present embodiment, $\theta$ can, for example, be rotated to an rotary angle of 180 degrees. $\theta$ may be, e.g., 60 degrees, 90 degrees, 120 degrees, and so on. Further, the angle $\theta$ can be precisely controlled by moving the driving rod 161.

The motor is used to drive the driving rod 161 to selectably move back and/or forth. The motor may, e.g., be a stepping motor, a DC (Direct Current) motor, or a servo motor and so on.

Figure 2:
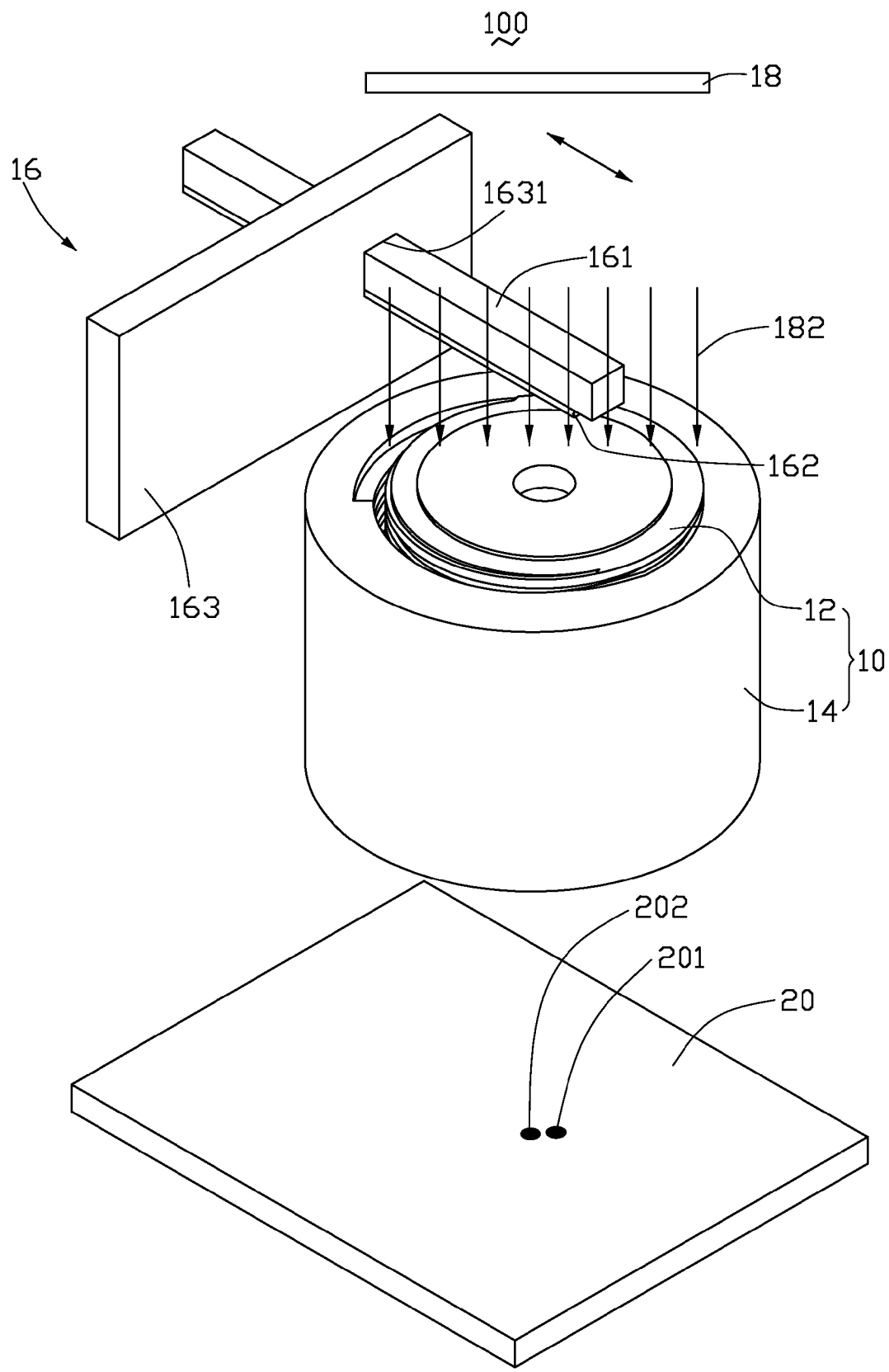
FIG. 2 is similar to FIG. 1, but a barrel is rotated to another position.

The retaining device 163 is used to limit the driving rod 161 to move in a linear direction relative to the barrel 12, as indicated by an arrow in FIGS. 1 and 2. A guiding hole 1631 is defined in the retaining device 163 and is configured for allowing the driving rod 161 to move back and/or forth along a defined horizontal direction (i.e. that shown by the arrow). The retaining device 163 may be another device, so long as the device can restrict/guide the movement of the driving rod 161.

A plurality of lens (not shown) is received in the barrel 12. An optical/focal axis of the barrel 12 should substantially overlap an optical/focal axis of the lens module 10, so long as they are appropriately configured/aligned. That is, the focus point of the lens module 10 should not vary significantly with a change of the rotational angle of the barrel 12 (as per a focusing step), if the lens modules 10 and the barrel 12 are properly aligned. The light source 18 is located over the top end of the lens module 10. A beam of light rays 182 emitted from the light source 18 is set to be parallel to a properly-aligned the optical axis of the lens module 10. The light source 18 irradiates the lens module 12 to cause the lens module 12 to create a focus.

The detecting device 20, situated under the lens module 10, is used to detect a deviation of the actual optical axis of the lens module 10 from the expected one. That is, the detecting device 20 is able to determine an actual focus location and is able to compare such to other measured focus locations and/or to an expected or theoretical focus location. Advantageously, the detecting device 20 is situated below the lens module 10, generally in expected optical alignment therewith, so as to be able to record a position of the actual focus of the lens module 10. The detecting device 20 may be a light sensor, such as a charge coupled device (CCD).

Referring to FIG. 2, FIG. 2 is similar to FIG. 1 except that the barrel 12 has been driven by the driving device 16 to rotate to another position. When the light source 18 irradiates the barrel 12 for the first time, the detecting device 20 measures the position of the first focus 201 that the lens module 10 projects. The barrel 12 is then rotated to another position. When the light source 18 irradiates the barrel 12 for the second time, the detecting device 20 measures the position of the second focus 202 created by the barrel 12. Finally, a deviation distance between the first and second focuses 201, 202 is measured, via the detecting device 20. It is then determined if the deviation distance falls into the allowable range. Advantageously, the first and second focuses 201, 202 substantially overlap one another. Further beneficially, the first and second focuses 201, 202 each overlap an expected/theoretical focal point of the lens module 10. Therefore, based on the positions of the first and second focuses 201, 202, it can be determined if the lens module 10 is qualified. If the deviation distance falls outside the allowable range, namely, the first and second focuses 201, 202 do not overlap one another and/or an expected/theoretical focal point of the lens module 10. Therefore, based on such a determination, the lens module 10 can be deemed disqualified.

Figure 3:
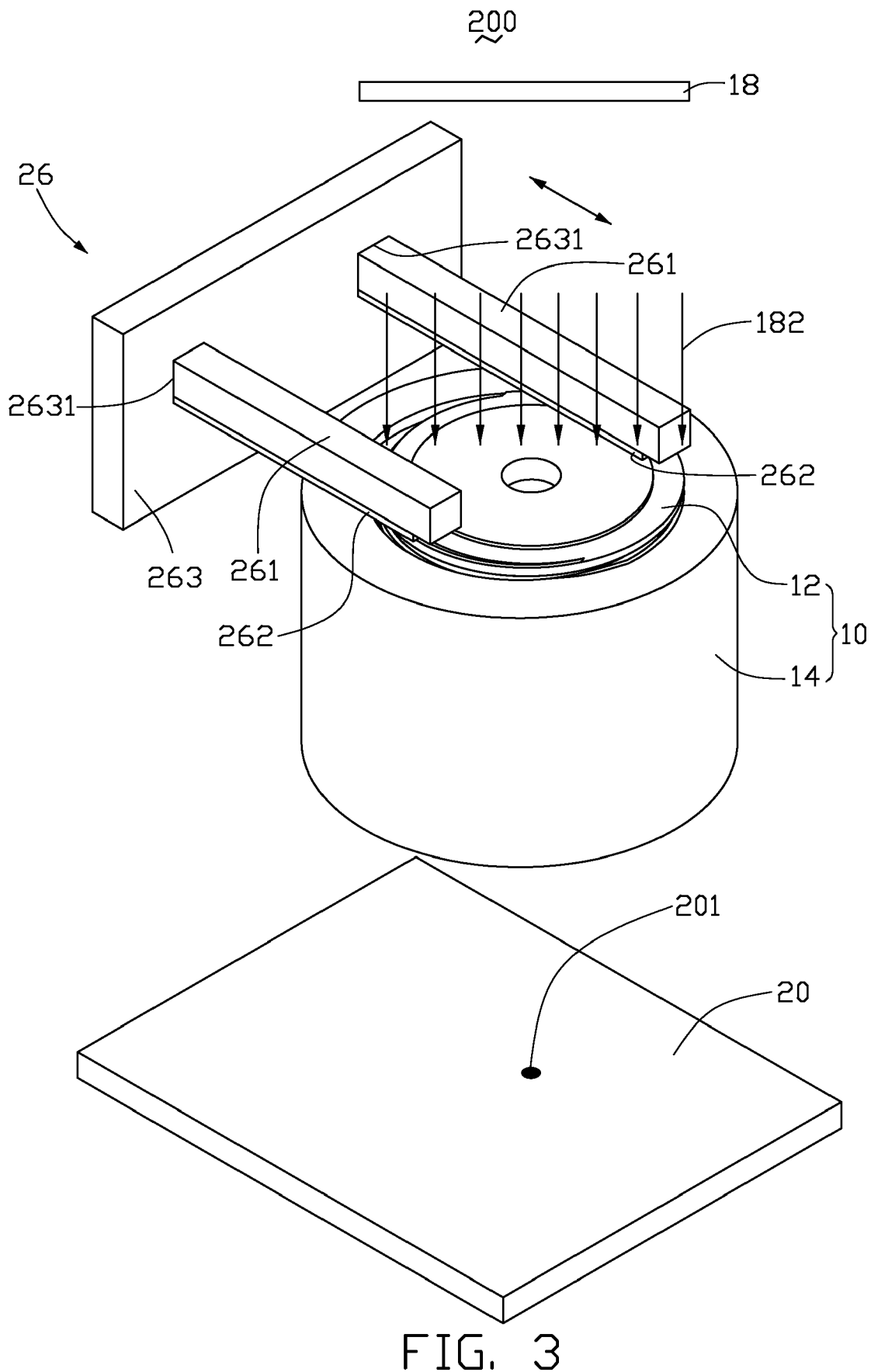
FIG. 3 is a schematic view of a detecting apparatus for detecting concentricity of a lens module according to a second present embodiment.

Referring to FIG. 3, a detecting apparatus 200 for detecting a concentricity of a lens module 10, according to a second present embodiment, includes a driving device 26 configured for driving the barrel to rotate, a light source 18, and a detecting device 20 configured for detecting a potential deviation of an optical (i.e., focal) axis of the lens module 10. The lens module 10 includes a barrel 12 and a holder 14.

The driving device 26 includes a pair of juxtaposed driving rods 261, a pair of friction blocks 262, a retaining member 263, and a motor (not labeled). The pair of friction blocks 262 is mounted on a bottom portion of each driving rod 261, each being respectively configured for contacting the barrel 12, respectively. The retaining member 263 is configured for selectably adjusting movement of the pair of driving rods 261. The two driving rods 261, situated over a top end of lens module 10, can be selectably moved back and/or forth by the motor. Beneficially, the friction block 262 is made of a rubber material with a high friction coefficient to enhance friction between the driving rod 161 and the barrel 12. Therefore, when the pair of driving rods 261 drives the barrel 12 to rotate relative to the holder 14, the two driving rods 261 are prevented from sliding relative to the barrel 12, and thereby are not capable of damaging a surface of the barrel 12. When the two driving rods 261 drive the barrel 12 to rotate relative to the holder 14, one of the two driving rods 261 moves forward, and the other driving rod 261 moves backward at the same time. According to the second embodiment, the following relation is satisfied between the driving rod 261 and the barrel 12: $L'=\theta r$, wherein $L'$ is a length of the driving rods 261, and $\theta$ is a rotary angle that the barrel 12 is driven to rotate relative to the holder 14, and r is a radius of the barrel 12. Thus, the rotary angle $\theta$ can be precisely controlled via moving the two driving rods 261. In the second embodiment, the detecting method for detecting concentricity of a lens module 10 is similar to the detecting method in the first embodiment.

The method of detecting concentricity of the lens module 10 includes the following steps.

(a) providing the light source 18. The light source 18 is located over the top end of the barrel 12. The light source 18 irradiates the lens module 10, the lens module 10 thereby forming the first focus 201.

(b) providing the detecting device 20. The detecting device 20 is located under a bottom end of the barrel 12. The detecting device 20 measures and records the position of the first focus 201.

(c) providing the driving device 16. The driving device 16 has the driving rod 16 with the friction block 162 mounted thereon. The driving rod 16 can be selectably driven to move back and/or forth. When the friction block 162 of the driving rod 16 drives the barrel 12, the barrel 12 is rotated to an angle $\theta$.

The light source 18 irradiates the lens module 10 again. The lens module 10 projects light on the detecting device 20 again to create the second focus 201, and, simultaneously, the detecting device 20 measures and records the position of the second focus 201. The deviation distance between the first and second focuses 201, 202, is measured via the detecting device 20. If the deviation distance falls into the allowable range, namely, the first and second focuses 201, 202 substantially overlap, the lens module 10 is thus considered qualified. If the deviation distance falls outside the allowable range, namely, the optical axis of the barrel 12 does not overlap the optical axis of the lens module 10. The lens module 10 is thus disqualified. It is to be understood that the qualified/unqualified reading could then be displayed/notified in any various fashion (e.g., green/red notification lights; e-mail and/or mobile-phone message; notice sent/transmitted to a display screen; etc.).

While certain embodiment has been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A detecting apparatus for detecting concentricity of a lens module, comprising:
   a light source for irradiating the lens module with light, the lens module thereby bringing the light into a focus;
   a detecting device being configured to measure and record a location of the focus; and
   a driving device for driving a barrel of the lens module to rotate relative to a holder of the lens module,
   wherein, when the driving device drives the barrel of the lens module to rotate to two different angular locations, the light source irradiates the lens module with light with the barrel at each respective angular location, each respective angular location has a corresponding focus associated therewith, the two different angular locations thereby have two focuses associated therewith, and the detecting device measures a deviation distance between the two focuses.

2. The detecting apparatus as claimed in claim 1, wherein the driving device has at least one driving rod thereon for driving the barrel of the lens module.

3. The detecting apparatus as claimed in claim 2, wherein a friction block is mounted on the at least one driving rod for contacting the barrel of the lens module.

4. The detecting apparatus as claimed in claim 3, wherein the friction block is a piece of rubber.

5. The detecting apparatus as claimed in claim 2, wherein the driving device has a pair of juxtaposed driving rods, and a movement direction of one of the pair of the driving rods is opposite to a movement direction of the other driving rod.

6. The detecting apparatus as claimed in claim 2, wherein the driving device further comprises a retaining device for retaining the driving rod and guiding a movement thereof.

* * * * *